United States Patent
Salter et al.

(10) Patent No.: US 11,951,860 B2
(45) Date of Patent: Apr. 9, 2024

(54) BATTERY CHARGING MANAGEMENT FOR MULTIPLE BATTERY ELECTRIC VEHICLES

(71) Applicant: Ford Global Technologies, LLC, Dearborn, MI (US)

(72) Inventors: Stuart Salter, White Lake, MI (US); Pietro Buttolo, Dearborn Heights, MI (US); Jim Baumbick, Northville, MI (US); Annette Huebner, Highland, MI (US); David Kennedy, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 443 days.

(21) Appl. No.: 17/341,966

(22) Filed: Jun. 8, 2021

(65) Prior Publication Data

US 2022/0388414 A1    Dec. 8, 2022

(51) Int. Cl.
*B60L 53/36* (2019.01)
*B60L 50/60* (2019.01)
(Continued)

(52) U.S. Cl.
CPC .............. *B60L 53/36* (2019.02); *B60L 50/60* (2019.02); *B60L 53/16* (2019.02); *B60L 53/305* (2019.02);
(Continued)

(58) Field of Classification Search
CPC .......... B60L 53/36; B60L 50/60; B60L 53/16; B60L 53/305; B60L 53/62; B60L 53/65;
(Continued)

(56) References Cited

U.S. PATENT DOCUMENTS 9,111,450 B2 * 8/2015 Stefan .................... G08G 1/149
2014/0125279 A1    5/2014 Juhasz
(Continued)

FOREIGN PATENT DOCUMENTS

CN    105539178 A    5/2016

OTHER PUBLICATIONS

Joshua Chynoweth et al, "Smart Electric Vehicle Charging Infrastructure Overview", Department of Mechanical and Aerospace Engineering, University of California, Los Angeles, California, 2014, 5 pages.
(Continued)

*Primary Examiner* — Brian P Sweeney
(74) *Attorney, Agent, or Firm* — Brandon Hicks; Eversheds Sutherland (US) LLP (57) ABSTRACT

The disclosure generally pertains to battery charging management of battery electric vehicles (BEVs). In an example method, a processor generates an operational profile for a first BEV among a number of BEVs. The profile may be based on a mileage accumulation pattern, a parking pattern, and/or a battery charging pattern, detected over an information collection period. The mileage accumulation pattern may be based on the use of the first BEV for commuting from a residence to a workplace. The processor determines an availability of a battery charging outlet in a section of a garage of the residence, and based on the operational profile of the first BEV, identifies a period of time for charging a battery of the first BEV in the garage. The processor then issues a directive to park the first BEV in the section of the garage over the identified period of time for charging the battery.

20 Claims, 4 Drawing Sheets

(51) Int. Cl.
*B60L 53/16* (2019.01)
*B60L 53/30* (2019.01)
*B60L 53/62* (2019.01)
*B60L 53/65* (2019.01)
*B60L 53/66* (2019.01)

(52) U.S. Cl.
CPC .............. *B60L 53/62* (2019.02); *B60L 53/65* (2019.02); *B60L 53/665* (2019.02)

(58) Field of Classification Search
CPC ........ B60L 53/665; B60L 53/64; B60L 53/67; B60L 53/68; B60L 53/63; B60L 53/00; B60L 53/60; B60L 53/66; Y02T 10/70; Y02T 10/7072; H01M 10/441; H01M 10/446; H02J 7/00032; H02J 7/0013
See application file for complete search history.

(56) References Cited

U.S. PATENT DOCUMENTS

2015/0348335 A1* 12/2015 Ramanujam ......... G05D 1/0282
   701/23
2019/0047434 A1*  2/2019 Oh ..................... G06Q 10/0631
2020/0350775 A1  11/2020 Penilla et al.

OTHER PUBLICATIONS

Raziq Yaqub, "Preferential Charging for Government Authorized Emergency-Electical Vehicles", T&D World, Oct. 31, 2019, 20 pages.

* cited by examiner

BATTERY CHARGING MANAGEMENT FOR MULTIPLE BATTERY ELECTRIC VEHICLES

BACKGROUND

People seeking to switch from an internal combustion engine vehicle to an electric vehicle typically weigh various factors such as, for example, a purchase price of the electric vehicle, a range of travel of the electric vehicle on a battery charge, and availability of battery charging facilities. The transition to electric vehicles is already taking place and is fueled by factors such as increased installation of battery charging stations in various places.

As can be expected, costs associated with installing and operating battery charging stations will reduce as they are more widely available. In the meantime, people have begun using public battery charging stations on a first-come-first-served basis. Such an approach may be acceptable for use by the general public because the demand for charging operations is staggered over time (throughout a day, for example), but may present certain disadvantages for entities such as, for example, families and fleet operators, that desire to charge multiple battery electrical vehicles concurrently (such as for purposes of heading out to work or school or before customers start coming in). It is therefore desirable to provide a solution to address this issue.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

In terms of a general overview, certain embodiments described in this disclosure are directed to systems and methods for managing battery charging operations for multiple battery electric vehicles (BEVs). In an example method in accordance with the disclosure, a processor generates an operational profile for a first BEV among a number of BEVs. The operational profile may be based on a mileage accumulation pattern, a parking pattern, and/or a battery charging pattern detected over an information collection period. The mileage accumulation pattern may be based on the use of the first BEV for commuting from a residence to a workplace or other destinations. The processor determines an availability of a battery charging outlet in a section of a garage of the residence, and based on the operational profile of the first BEV, identifies a period of time for charging a battery of the first BEV in the garage. The processor then issues a directive to park the first BEV in the section of the garage over the identified period of time for charging the battery.

In another example method in accordance with disclosure, a first processor may generate a first operational profile for a first BEV and a second operational profile for a second BEV. The first operational profile may be detected over an information collection period and may include a mileage accumulation pattern, a parking pattern, and/or a battery charging pattern for the first BEV. The first processor may be a part of a first computer located in the first BEV or may be a server computer located in the cloud.

A second processor may generate a second operational profile for a second BEV. The second processor may be a part of a second computer located in the second BEV or may be the server computer located in the cloud. The second operational profile may be detected over the same (or different) information collection period and may include a mileage accumulation pattern, a parking pattern, and/or a battery charging pattern for the second BEV.

A cooperative arrangement is then established between the first computer and the second computer and a first charging priority assigned to the first BEV based on the first operational profile and a second charging priority assigned to the second BEV based on the second operational profile. Based on the assigned charging priority, the first BEV may be parked at a first parking spot over a first period of time for charging the first battery of the first BEV.

ILLUSTRATIVE EMBODIMENTS

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "electric vehicle" and the phrase "battery electric vehicle" (BEV) may be used interchangeably in this disclosure and must be understood to refer to any type of vehicle that operates an electric motor by use of a rechargeable battery. The word "battery" as used herein encompasses a single battery as well as a set of batteries that are interconnected to form a battery bank. The word "directive" as used herein refers to an advisory message displayed on a display screen instructing a driver of a vehicle to take responsive action (when the vehicle is a driver-operated vehicle) and refers to a command that is sent to a vehicle computer commanding the vehicle computer to take responsive action (when the vehicle is an autonomous vehicle). It must be understood that words such as "implementation," "scenario," "case," "application," and "situation" are to be understood as examples in accordance with the disclosure. It should be understood that the word "example" as used herein is intended to be non-exclusionary and non-limiting in nature.

Figure 1:
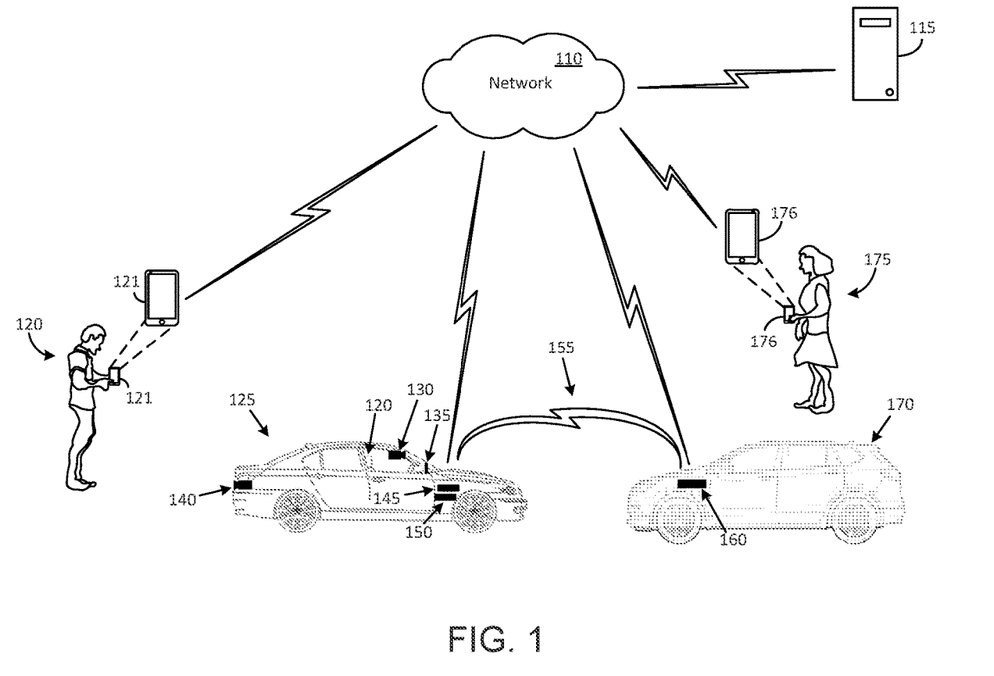
FIG. 1 illustrates an example configuration involving the use of a battery charging management system in accordance with an embodiment of the disclosure.

FIG. 1 illustrates an example configuration involving the use of a battery charging management system in accordance with an embodiment of the disclosure. In one example embodiment, the battery charging management system includes a computer that is located in a battery electric vehicle, such as, for example, in a vehicle 125 and/or a vehicle 170. In another example embodiment, the battery charging management system includes a computer that is located outside a vehicle, such as, for example, a server computer 115.

The vehicle 125 may be any of various types of vehicles such as, for example, a sedan, a sports utility vehicle, a truck, a van, a bus, an electric vehicle, a battery electric vehicle, a driver-operated vehicle, a semi-autonomous vehicle, or an autonomous vehicle. In the illustrated example, the vehicle 125 is operated by a driver 120 and the vehicle 170 is an autonomous vehicle. The vehicle 125 can include components such as, for example, a vehicle computer 145, an infotainment system 135, a battery charging management system 150, and various sensors and detection devices. The vehicle 170 can be similarly equipped, and includes a battery charging management system 160 that may be substantially similar to the battery charging management system 150.

The vehicle computer 145 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.).

In the illustrated scenario, the battery charging management system 150 is configured to execute various functions associated with battery charging management of a battery of the electric vehicle 125. As a part of the configuration, the battery charging management system 150 may be communicatively coupled to the vehicle computer 145 and the infotainment system 135 via wired and/or wireless connections. More particularly, in one implementation, the battery charging management system 150 is communicatively coupled to the vehicle computer 145 and the infotainment system 135 via a vehicle bus that uses a controller area network (CAN) bus protocol, a Media Oriented Systems Transport (MOST) bus protocol, and/or a CAN flexible data (CAN-FD) bus protocol. In another implementation, the communications may be provided via wireless technologies such as Bluetooth®, Ultra-Wideband, Wi-Fi, Zigbee®, or near-field-communications (NFC).

The infotainment system 135 can include elements such as, for example, a radio, an MP3 player, a global positioning system (GPS) device, a clock, and a display screen. The infotainment system 135 can further include a graphical user interface (GUI) or a human machine interface (HMI) displayed on the display screen. The GUI or HMI accepts input from an occupant of the vehicle 125 (the driver 120, for example) and/or displays various items pertaining to battery charging management such as, for example, messages, advisories, directives and/or warnings. An example message may be a directive provided by the battery charging management system 150 instructing the driver 120 to park the electric vehicle 125 in a specific section of a garage over a first period of time for charging the battery of the electric vehicle 125.

The battery charging management system 150 may be configured to communicate via a network 110 with various devices such as, for example, the server computer 115 and the battery charging management system 160 of the electric vehicle 170. The battery charging management system 150 may be further configured to bypass the network 110 and communicate directly with the battery charging management system 160 of the electric vehicle 170 using a wireless communication link 155 employing communications technologies such as vehicle-to-vehicle (V2V) communications. In some applications, the battery charging management system 150 may be further configured to communicate with various objects located outside the vehicle 125 by using vehicle-to-infrastructure (V2I) communications.

The network 110 may include any one, or a combination of networks, such as a local area network (LAN), a wide area network (WAN), a telephone network, a cellular network, a cable network, a wireless network, and/or private/public networks such as the Internet. For example, the network 110 may support communication technologies such as Wi-Fi, Wi-Fi direct, Ultra-Wideband (UBW), machine-to-machine communication, and/or man-to-machine communication.

At least one portion of the network 110 includes a wireless communication link (a WiFi link, for example), that allows the battery charging management system 150 and/or the infotainment system 135 of the vehicle 125 to communicate with the server computer 115. The network 110 may also support a wireless communication link (a cellular link, for example) that allows the server computer 115 communicate with a personal communication device 121 carried by the driver 120 of the vehicle 125 and/or a personal communication device 176 carried by an individual 175. The individual 175 may be an occupant of the electric vehicle 170 when the electric vehicle 170 is an autonomous vehicle. The personal communication device 121 and the personal communication device 176 can be any of various devices such as, for example, a smartphone, a tablet computer, a phablet (phone plus tablet), a wearable computer, or a laptop computer.

The vehicle 125 may include various sensors and detection devices that are communicatively coupled to the battery charging management system 150 and/or the vehicle computer 145. A few examples of such sensors and detection devices may include a camera, an ultrasonic sensor, a radar sensor, a global positioning system (GPS), a battery charge level sensor, a vehicle speed sensor, and/or a vehicle locator device. In the illustrated example, the detection devices include a camera 130 and a camera 140. The camera 130, which can be mounted on a rear-view mirror or a dashboard of the vehicle 125, is arranged to capture images of objects located in front of the vehicle 125. The camera 140, which can be mounted on a rear bumper of the vehicle 125, is arranged to capture images of objects located behind the vehicle 125. The camera 140 and/or the camera 130 can be a digital camera that captures digital pictures or a video camera that captures video clips or produces streaming video. In some applications the camera 140 and/or the camera 130 can be a night-vision camera that captures images and/or video in low light conditions.

The camera 130 and/or the camera 140 may capture images of objects around the electric vehicle 125 and convey the captured images to the battery charging management system 150. The battery charging management system 150 may evaluate these images for various purposes such as, for example, to identify a location of a battery charging outlet on a wall or on a charging station.

In an exemplary embodiment in accordance with the disclosure, the battery charging management system 150 generates an operational profile of the electric vehicle 125 based on evaluating various types of historical information collected over an information collection period such as, for example, a week, a month, a year, or several years. In another exemplary embodiment in accordance with the disclosure, the battery charging management system 150 generates an operational profile of the electric vehicle 125 based on answers obtained from the driver 120 in response to a questionnaire that may be provided on devices such as, for example, the infotainment system 135 and/or the personal communication device 121.

The operational profile of the electric vehicle 125 may be generally dependent on how the electric vehicle 125 is used during the information collection period and the impact of the usage on the battery of the electric vehicle 125. A few examples of the collected information can include, for example, a mileage accumulation pattern, a parking pattern, and a battery charging pattern.

In an example scenario, the driver 120 uses the electric vehicle 125 primarily to commute during weekdays from his/her residence to a work place. The mileage accumulation pattern is based on a distance between the residence and the workplace and use of the electric vehicle 125 five days a week to travel back and forth between the residence and the workplace. The electric vehicle 125 is generally parked at a parking lot near the workplace during the work day.

In a first example situation, the battery of the electric vehicle 125 has a charge capacity that is adequate for the electric vehicle 125 to travel to the workplace and return to the residence. In this situation, the driver 120 may prefer to charge the battery overnight at his/her residence. The driver 120 may prefer to charge the battery in this manner for various reasons such as, for example, due to lack of battery charging facilities at the workplace, a cost of charging the battery at a battery charging station at the workplace, and inconvenience associated with charging the battery during work hours.

The operational profile of the electric vehicle 125 in this case may be based primarily on the mileage accumulation pattern of the electric vehicle 125 as a result of the commute between the residence and the workplace, the parking pattern of the driver 120, the preferred battery charging time and place, and the weekday travel pattern of the driver 120. The battery charging management system 150 may generate this operational profile by obtaining some types of data from various devices in the electric vehicle 125 such as, for example, the odometer, the GPS system, the camera 130, the camera 140, and the clock. Some other types of data may be obtained from the driver 120 based on queries provided by the battery charging management system 150 on the display screen of the infotainment system 135 and/or based on utility billing information obtained from the server computer 115. The server computer 115 may, for example, be operated by an electric utility company that provides electricity to the residence of the driver 120.

In a second example situation, the battery of the electric vehicle 125 has a charge capacity that is adequate for the electric vehicle 125 to travel to the workplace but not enough to make the trip back to the residence. The driver 120 has no option but to charge the battery of the electric vehicle 125 either at the workplace or at a charging station located on a travel route between the residence and the workplace. In one scenario, the driver 120 may decide to charge the battery of the electric vehicle 125 at a charging station provided at the workplace for reasons such as, for example, because the charging operation is provided free of charge and/or because the charging operation can be carried out during work without having to wait explicitly for the battery charging to be completed (as would be the case if the charging was carried out on the way when traveling from or to the workplace). In another scenario, the workplace may lack battery charging facilities and the driver 120 has to charge the battery on the way when traveling from or to the workplace. The cost of charging the battery at a battery charging station may vary from place to place.

The operational profile of the electric vehicle 125 in this second example case may be based primarily on the mileage accumulation pattern between the residence and the workplace, the parking pattern, and battery charging battery associated with the driver 120 and his/her weekday travel pattern. The battery charging management system 150 may generate this operational profile by obtaining data from various devices in the electric vehicle 125 such as, for example, the odometer, the GPS system, the camera 130, the camera 140, and the clock. The costs associated with charging the battery may be obtained by the battery charging management system 150 from various sources such as, for example, information input by the driver 120 in response to a query by the battery charging management system 150 displayed on the display screen of the infotainment system 135, or from the server computer 115 which may be operated by a credit card company or a bank, for example.

In the example scenario described above, the driver 120 uses the electric vehicle 125 primarily to commute during weekdays from his/her residence to a work place. On the other hand, the electric vehicle 170 may be used by the individual 175 for reasons other than a daily weekday commute between the residence and a work place. For example, in one case, the individual 175 is a youngster who uses the electric vehicle 170 to commute to an educational institution, such as a school or a college. In another case, the individual 175 is a stay-at-home mother who uses the electric vehicle 170 for domestic purposes such as shopping, meeting friends, and visiting places.

The description provided above with respect to the electric vehicle 125 when used for commuting between the residence and the work place can be equally applicable to the electric vehicle 170 when used for commuting between the residence and the educational institution with some differences such as, for example, the distance between the residence and the educational institution and charging facilities (and charging fees) at the educational institution. The battery charging management system 160 may generate an operational profile of the electric vehicle 170 based primarily on the mileage accumulation pattern between the residence and the educational institution, the parking pattern at the educational institution, and battery charging pattern associated with the individual 175.

In the case where the electric vehicle 170 is used for domestic purposes, the battery charging management system 160 may generate an operational profile of the electric vehicle 170 based primarily on an average mileage traveled over a period of time such as a week or a month, for example. The parking pattern may be based on the electric vehicle 170 being parked most of the day and the night at the residence. The battery charging pattern applicable to the electric vehicle 170 may be characterized as flexible and aperiodic, and costs associated with charging may be determined based on electricity consumption from a battery charging outlet at the residence rather than elsewhere. Electricity charges may vary between various hours of the day and night and the flexible nature of the battery charging pattern can accommodate an optimization of both cost and time for charging the battery of the electric vehicle 170.

The flexible and aperiodic nature of the battery charging pattern for the electric vehicle 170 also allows the battery charging management system 160 to assign a lower priority level for battery charging of the battery in the electric vehicle 170 in comparison with a priority level for battery charging of the battery in the electric vehicle 125.

In one example implementation in accordance with the disclosure, a battery charging prioritization procedure may be executed cooperatively between the electric vehicle 125 and the electric vehicle 170 (and any other electric vehicles used by residents of the residence). As a part of this procedure, the battery charging management system 160 of the electric vehicle 170 may communicate with the battery charging management system 150 of the electric vehicle 125 over the wireless communication link 155 and/or via the network 110 in order to exchange operational profiles and negotiate battery charging priority levels between the two vehicles.

In another example implementation in accordance with the disclosure, a battery charging prioritization procedure may be executed by the server computer 115. As a part of this procedure, the server computer 115 may obtain the operational profile of the electric vehicle 125, the operational profile of the electric vehicle 170, and other information such as, for example, availability of a battery charging outlet at the residence. The server computer 115 may evaluate the operational profiles of the electric vehicles and the additional information to determine and to assign battery charging priority levels to the various electric vehicles.

In yet another example implementation in accordance with the disclosure, a software application may be downloaded into the personal communication device 121 of the driver 120. The software application may execute some or all of the functions described herein with respect to the battery charging management system 150. The software application may be similarly downloaded into the personal communication device 176 of the individual 175 for executing some or all of the functions described herein with respect to the battery charging management system 160.

In one example scenario, the personal communication device 121 may communicate with the personal communication device 176 for purposes such as negotiating and determining a priority level for charging the battery of the electric vehicle 125 and/or the electric vehicle 170.

In another example scenario, the personal communication device 121 may provide to the battery charging management system 150 of the electric vehicle 125, the battery charging management system 160 of the electric vehicle 170, the server computer 115, and/or the personal communication device 176, calendar information of the driver 120 to assist one or more of these devices to determine battery charging procedures (times, places, etc.) for the electric vehicle 125 and/or the electric vehicle 170.

Figure 2:
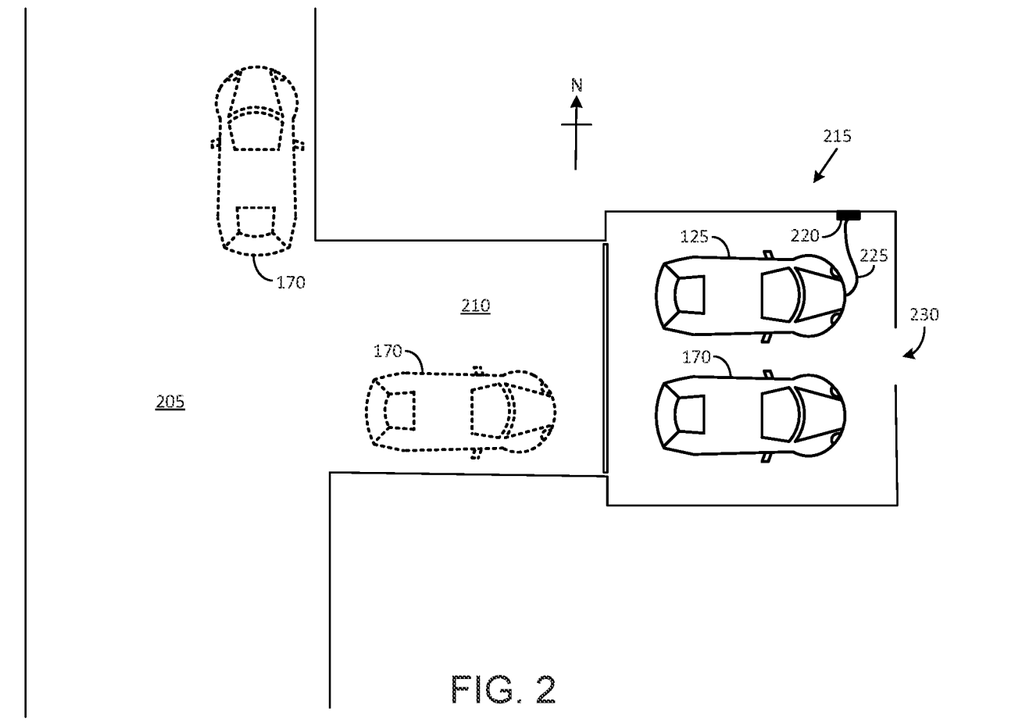
FIG. 2 illustrates a first example battery charging management scenario in accordance with an embodiment of the disclosure.

FIG. 2 illustrates a first example battery charging management scenario in accordance with an embodiment of the disclosure. In this example scenario, the electric vehicle 125 and the electric vehicle 170 may be parked inside a two-car garage 215 attached to a residence. A doorway 230 provides access between the garage 215 and the residence. The two-car garage 215 includes a battery charging outlet 220 mounted on a wall on the northern side of the two-car garage 215.

In accordance with an embodiment of the disclosure, the battery charging management system 150 of the electric vehicle 125 and the battery charging management system 160 of the electric vehicle 170 may cooperate with each other (either directly, or via the server computer 115) to identify a first period of time for charging the battery of the electric vehicle 125 and a second period of time for charging the battery of the electric vehicle 170. The first and second periods of time may be determined on factors such as, for example, the operational profile of each of the two vehicles, the priority levels for charging the battery of the two electric vehicles (if priority levels have been determined), and/or a commute schedule of the driver 120 and/or the individual 175.

In an example scenario, the electric vehicle 125 may be assigned a higher battery charging priority level than the electric vehicle 170, and battery charging management system 150 of the electric vehicle 125 may direct the driver 120 of the electric vehicle 125 to park the electric vehicle 125 in a first parking spot (adjacent to a wall on the northern side of the two-car garage 215) for charging a battery of the electric vehicle 125 over a first period of time (overnight, for example, based on a commute schedule of the driver 120). The driver 120 may park the electric vehicle 125 in the first parking spot and couple the battery of the electric vehicle 125 to the battery charging outlet 220 via a charging cable 225. During this first period of time, the electric vehicle 170 may be parked in a second parking spot located adjacent to a wall on the southern side of the two-car garage 215 or in a third parking spot located elsewhere such as, for example, on a driveway 210 or next to a sidewalk on a road 205.

Upon expiry of the first period of time, the driver 120 may vacate the first parking spot after uncoupling the charging cable 225 from the electric vehicle 125. The battery charging management system 160 of the electric vehicle 170 (an autonomous vehicle, for example) may detect the availability of the vacated first parking spot in any of various ways such as, for example, via communications with the battery charging management system 150 of the electric vehicle 125. The battery charging management system 160 may issue a command to a vehicle computer of the electric vehicle 170 to autonomously move the electric vehicle 170 into the first parking spot and charge the battery of the electric vehicle 170 over a second period of time subject to availability of the first parking spot for the second period of time (during the day, for example). In an example implementation, a robotic arm (not shown) may be manipulated for coupling the charging cable 225 to the electric vehicle 170. In another example implementation, the electric vehicle 170 may park above a charging plate of a proximity battery charging apparatus (inductive or capacitive coupling charging) that may be provided in the first parking spot lieu of, or in addition to, the battery charging outlet 220.

In one example implementation, the first period of time and/or the second period of time for battery charging that is referred to above, may be a fixed amount of time (extending over work hours of a work day, for example) that is determined as a one-time event by the battery charging management system 150 of the electric vehicle 125, the battery charging management system 160 of the electric vehicle 170, and/or the server computer 115.

In another example implementation, the first period of time and/or the second period of time for battery charging that is referred to above, may be a variable amount of time due to various factors such as, for example, because the driver 120 of the electric vehicle 125 operates a business out of his/her residence and may use the electric vehicle 125 for traveling to his/her customers in an irregular manner. Consequently, the availability of the first parking spot and the characteristics of the first period of time (duration, periodicity, etc.) may vary.

In such a situation, the battery charging management system 150 of the electric vehicle 125, the battery charging management system 160 of the electric vehicle 170, and/or the server computer 115 may communicate with each other in real time or on as-needed basis in order to evaluate and determine the availability of the first parking spot. Thus, for example, the battery charging management system 160 of the electric vehicle 170 that has been assigned a lower battery charging priority level may instruct the vehicle computer of the electric vehicle 170 to move the electric vehicle 170 out of the first parking spot at certain times, based on real-time charging requirements of the battery of the electric vehicle 125 having a higher battery charging priority level.

The description above refers to a two-car garage 215. However, it must be understood that the description is equally relevant to other types of structures such as, for example, a one-car garage, a driveway, a porch, or a lawn. The battery charging outlet may be located at various places and in various structures (charging station. post, pillar, etc.). In an example scenario, a battery charging outlet may be equally accessible to more than one parked electric vehicle (mounted on a post located between two parking spots, for example). In this scenario, the description provided above with respect to the first and second periods of time and the battery charging priority levels will apply without the need to move either one or both electric vehicles in and out of parking spots.

Figure 3:
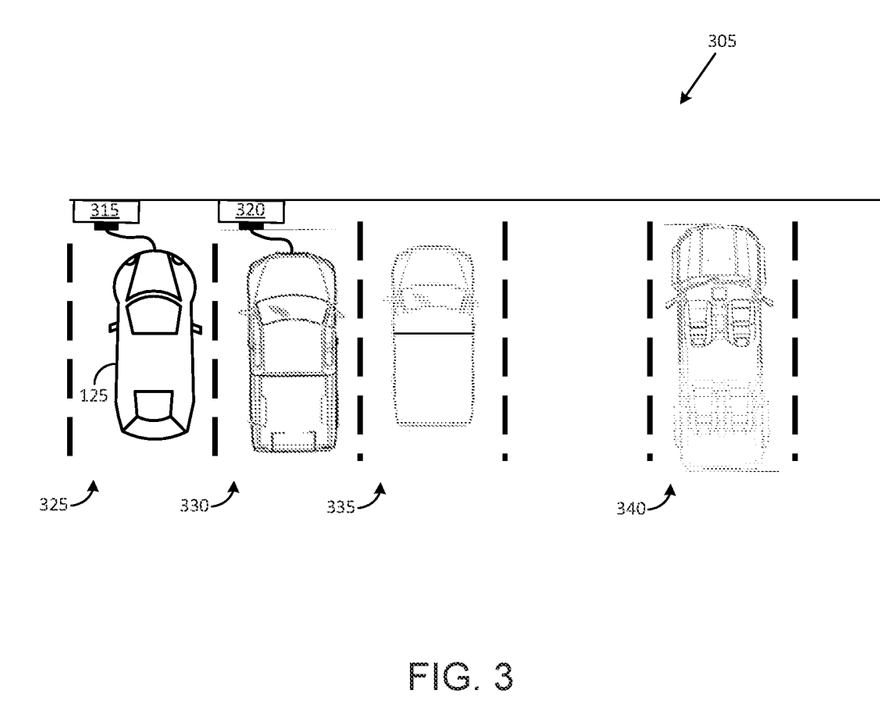
FIG. 3 illustrates a second example battery charging management scenario in accordance with an embodiment of the disclosure.

FIG. 3 illustrates a second example battery charging management scenario in accordance with an embodiment of the disclosure. In this example scenario, the electric vehicle 125 is parked in a parking lot 305 located, for example, in a workplace, a commercial establishment (shopping mall, for example), or an educational institution (high school, for example). The electric vehicle 125 is parked in a parking spot 325 having access to a battery charging outlet 315. An adjacent parking spot 330 provides access to another battery charging outlet 320. Other parking spots such as, for example, a parking spot 335 and a parking spot 340 may not have access to battery charging outlets.

The battery charging management system 150 of the electric vehicle 125 may detect the location of the electric vehicle 125 (in parking spot 325 having the battery charging outlet 315) and also detect a period of time over which the electric vehicle 125 is parked in the parking spot 325. The location of the electric vehicle 125 may be detected, for example, by evaluating images captured by the camera 130 and/or the camera 140, and/or by obtaining location coordinates from a global positioning system (GPS) device that can be a part of the infotainment system 135. The parking time information may be obtained from a clock or a timing device in the electric vehicle 125.

The battery charging management system 150 may convey the location and time information to the server computer 115 and/or the battery charging management system 160 of the electric vehicle 170 (via the network 110). The information may be used by the server computer 115, the battery charging management system 160, and/or the battery charging management system 150 to carry out operations such as, for example, generating an operational profile, executing a battery charging prioritization procedure, and/or executing a battery charging procedure (such as, for example, identifying a first period of time and a second period of time for charging a battery).

Figure 4:
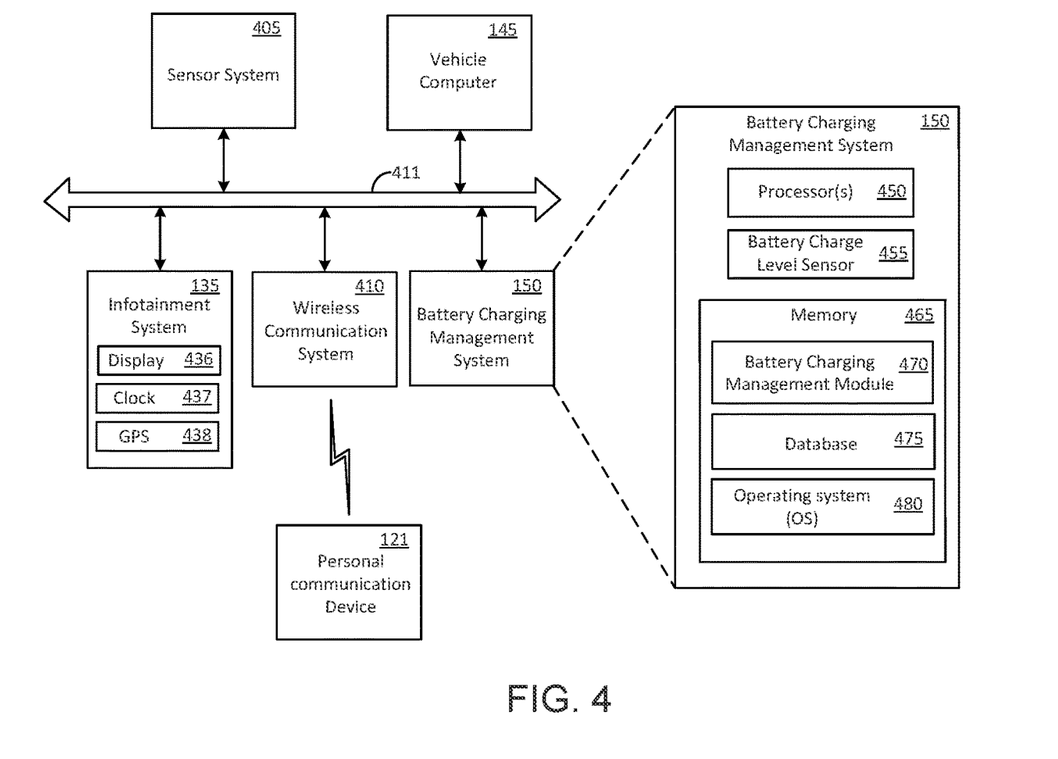
FIG. 4 shows some example components that may be included in a vehicle in accordance with an embodiment of the disclosure.

FIG. 4 shows some example components that may be provided in the vehicle 125 in accordance with an embodiment of the disclosure. It must be understood that the description below with reference to the vehicle 125 and the battery charging management system 150 is equally relevant to the vehicle 170 and the battery charging management system 160.

The example components in the vehicle 125 can include a sensor system 405, the vehicle computer 145, the infotainment system 135, a wireless communication system 410, and the battery charging management system 150, which are communicatively coupled to each other via a bus 411. The bus 411 can be implemented using one or more of various wired and/or wireless technologies. For example, the bus 411 can be a vehicle bus that uses a controller area network (CAN) bus protocol, a Media Oriented Systems Transport (MOST) bus protocol, and/or a CAN flexible data (CAN-FD) bus protocol. Some or all portions of the bus 411 may also be implemented using wireless technologies such as Bluetooth®, ZigBee®, or near-field-communications (NFC), cellular, Wi-Fi, Wi-Fi direct, machine-to-machine communication, and/or man-to-machine communication.

The sensor system 405 may include various sensors and detection devices that are communicatively coupled to the battery charging management system 150 and/or the vehicle computer 145. A few examples of such sensors and detection devices can include a camera, an ultrasonic sensor, a radar sensor, a global positioning system (GPS), a battery charge level sensor, a vehicle speed sensor, and/or a vehicle locator device.

The wireless communication system 410 may include elements such as, for example, wireless transmitters and receivers that enable communications between the battery charging management system 150 and various devices, such as, for example, the battery charging management system 160 of the electric vehicle 170, the personal communication device 121 of the driver 120, the personal communication device 176 of the individual 175, and/or the server computer 115.

The infotainment system 135 can be an integrated unit that includes various components such as, for example, a radio, an MP3 player, a display 436, a clock 437, and a GPS device 438. The display 436 may include a graphical user interface (GUI) for use by the driver 120 to respond to a questionnaire provided by the battery charging management system 150 for generating an operation profile of the electric vehicle 125. The GUI may be omitted in some implementations where the electric vehicle 125 is an autonomous vehicle and no input is sought from the occupants of the autonomous vehicle.

The battery charging management system 150 may include a processor 450, a battery charge level evaluator 455, and a memory 465. In some implementations, some or all parts of the battery charging management system 150 (such as, for example, the processor 450 and the memory 465), may be incorporated into the vehicle computer 145. The memory 465, which is one example of a non-transitory computer-readable medium, may be used to store an operating system (OS) 480 and various code modules such as, for example, a battery charging management module 470. The code modules are provided in the form of computer-executable instructions that can be executed by the processor 450 for performing various operations in accordance with the disclosure. More particularly, the battery charging management module 470 may be executed by the processor 450 for performing various operations in accordance with the disclosure.

In an example battery charging procedure, the processor 450 may cooperate with the battery charge level evaluator 455 to determine a level of charge in a battery of the electric vehicle 125. The charge level information may be obtained by the battery charge level evaluator 455 from a battery charge level sensor of the sensor system 405. In an example scenario, the battery charging management system 150 may determine that a charge level of the battery in the electric vehicle 125 has dropped below a threshold charge level. The battery charging management system 150 may then cooperate with the battery charging management system 160 of the electric vehicle 170 to direct the electric vehicle 170 to vacate the charging spot adjacent to the northern wall of the garage 215, for example, so as to allow the electric vehicle 125 to move into the parking spot and use the battery charging outlet 220. A similar procedure may be applied in order to direct the electric vehicle 125 to vacate the parking spot and allow the electric vehicle 170 to use the battery charging outlet 220.

The database 475 may be used to store various types of information such as for example, an operational profile, a battery charging priority level, parking spot information, battery charging outlet information, a commute schedule, and a threshold charge level for the battery.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," or "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 450 or the processor 510, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 465, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not in function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    generating, by one or more processors, a first operational profile for a first electric vehicle, the first operational profile comprising a first mileage accumulation pattern, a first parking pattern, and/or a first battery charging pattern detected over an information collection period;
    determining, by the one or more processors, an availability of a first battery charging outlet at a first parking spot;
    identifying, by the one or more processors and based on the first operational profile, a first period of time for charging a first battery of the first electric vehicle at the first parking spot; and
    autonomously moving, by the first electric vehicle, to park the first electric vehicle at the first parking spot over the first period of time for charging the first battery of the first electric vehicle.

2. The method of claim 1, wherein the first mileage accumulation pattern is based in part on a first commute schedule of the first electric vehicle between a residence and a first destination, wherein the first parking spot is located at the first destination, and wherein identifying the first period of time for charging the first battery is based on a length of time over which the first electric vehicle is parked at the first destination.

3. The method of claim 2, wherein identifying the first period of time for charging the first battery is further based on a cost associated with charging the first battery at the first parking spot.

4. The method of claim 1, wherein the first mileage accumulation pattern is based in part on a first commute schedule of the first electric vehicle between a residence and one of a workplace, an educational institution, or a commercial establishment, wherein the first parking spot is located at the one of the workplace, the educational institution, or the commercial establishment, and wherein identifying the first period of time for charging the first battery is based on a length of time over which the first electric vehicle is parked at the one of the workplace, the educational institution, or the commercial establishment.

5. The method of claim 1, further comprising:
    generating, by the one or more processors, a second operational profile for a second electric vehicle, the second operational profile comprising a second mileage accumulation pattern, a second parking pattern, and/or a second battery charging pattern detected over the information collection period;
    identifying, by the one or more processors, based on the second operational profile, and based on a communication between the first electric vehicle and the second electric vehicle, a second period of time for charging a second battery of the second electric vehicle;
    autonomously moving, by the first electric vehicle and based on the communication, the first electric vehicle away from the first parking spot; and
    autonomously moving, by the second electric vehicle and based on a determination that the first electric vehicle has vacated the first parking spot, to park the second electric vehicle at the first parking spot over the second period of time for charging the second battery of the second electric vehicle.

6. The method of claim 1, further comprising:
    generating, by the one or more processors, a second operational profile for a second electric vehicle, the second operational profile comprising a second electric vehicle, the second operational profile comprising a second mileage accumulation pattern, a second parking pattern, and/or a second battery charging pattern, detected over the information collection period;
    detecting, by the one or more processors, a charge level of a second battery of the second electric vehicle dropping below a threshold charge level;
    issuing, by the one or more processors, a second directive to the first electric vehicle to vacate the first parking spot; and
    issuing, by the one or more processors, a third directive to the second electric vehicle to occupy the first parking spot and use the first battery charging outlet to charge the second battery of the second electric vehicle.

7. The method of claim 6, wherein the first parking spot is located in a first section of a garage on the premises of a residence, and wherein the method further comprises:
issuing, by the one or more processors, a fourth directive to the first electric vehicle to move to a second parking spot located in a second section of the garage or to a driveway on the premises of the residence.

8. A method comprising:
generating a first operational profile for a first electric vehicle, the first operational profile comprising a first mileage accumulation pattern, a first parking pattern, and/or a first battery charging pattern detected over an information collection period;
generating a second operational profile for a second electric vehicle, the second operational profile comprising a second electric vehicle, the second operational profile comprising a second mileage accumulation pattern, a second parking pattern, and/or a second battery charging pattern detected over the information collection period;
assigning a first charging priority to the first electric vehicle based on the first operational profile and a second charging priority to the second electric vehicle based on the second operational profile; and
parking, based on the first charging priority, the first electric vehicle at a first parking spot over a first period of time for charging the first battery of the first electric vehicle.

9. The method of claim 8, wherein the first parking spot is located in a first section of a garage on the premises of a residence, and wherein the method further comprises:
parking, based on the second charging priority, the second electric vehicle at a second parking spot located in a second section of the garage or in a driveway on the premises of the residence.

10. The method of claim 8, wherein the first operational profile is based on use of the first electric vehicle by a first individual residing at a residence, and wherein the second operational profile is based on use of the second electric vehicle by a second individual residing at the residence.

11. The method of claim 10, wherein the first mileage accumulation pattern is based in part on a first commute schedule of the first individual between the residence and a first destination, and wherein the first parking spot is located at the residence.

12. The method of claim 11, wherein the first destination is one of a workplace, an educational institution, or a commercial establishment.

13. The method of claim 8, further comprising:
detecting a charge level of a second battery of the second electric vehicle dropping below a threshold charge level;
issuing a first directive to the first electric vehicle to vacate the first parking spot; and
parking the second electric vehicle at the first parking spot over a second period of time for charging the second battery of the second electric vehicle.

14. A system comprising:
a computer comprising:
a memory that stores computer-executable instructions; and
a processor configured to access the memory and execute the computer-executable instructions to perform operations comprising:
generating a first operational profile for a first electric vehicle, the first operational profile comprising a first mileage accumulation pattern, a first parking pattern, and/or a first battery charging pattern detected over an information collection period;
determining an availability of a first battery charging outlet at a first parking spot at a first location;
identifying, based on the first operational profile, a first period of time for charging a first battery of the first electric vehicle at the first parking spot; and
autonomously moving, by the first electric vehicle, to park the first electric vehicle at the first parking spot over the first period of time for charging the first battery of the first electric vehicle.

15. The system of claim 14, wherein the first location is one of a workplace, a residence, an educational institution, or a commercial establishment, and wherein identifying the first period of time for charging the first battery is based on a length of time over which the first electric vehicle is parked at the first location and/or a first cost associated with using the first battery charging outlet.

16. The system of claim 14, wherein the first parking spot is located on the premises of a residence, and wherein the processor is further configured to access the memory and execute additional computer-executable instructions to perform operations comprising:
comparing a first cost associated with using the first battery charging outlet to a second cost associated with using a second battery charging outlet at a second location elsewhere; and
issuing, based on the second cost being lower than the first cost, a second directive to charge the first battery of the first electric vehicle at the second battery charging outlet.

17. The system of claim 14, wherein the first electric vehicle is an autonomous vehicle, and wherein the computer is one of a personal communication device, a server computer, or is a part of the first electric vehicle.

18. The system of claim 14, wherein the computer is one of a personal communication device, a server computer, or is a part of the first electric vehicle.

19. The system of claim 14, wherein the first parking spot is located in a first section of a garage on the premises of a residence, and wherein the processor is further configured to access the memory and execute additional computer-executable instructions to perform operations comprising:
assigning a first charging priority to the first electric vehicle based on the first operational profile;
identifying a second charging priority assigned to a second electric vehicle based on a second operational profile of the second electric vehicle;
comparing the first charging priority to the second charging priority; and
moving, based on the first charging priority being lower than the second charging priority, the first electric vehicle from the first parking spot to a second parking spot located in a second section of the garage.

20. The system of claim 19, wherein the first operational profile is based on use of the first electric vehicle by a first individual residing at the residence, and the second operational profile is based on use of the second electric vehicle by a second individual residing at the residence.

* * * * *